United States Patent
Chang

(10) Patent No.: US 9,671,823 B2
(45) Date of Patent: Jun. 6, 2017

(54) HOUSING AND ELECTRONIC DEVICE USING THE SAME

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 38 days.

(21) Appl. No.: 14/737,803

(22) Filed: Jun. 12, 2015

(65) Prior Publication Data

US 2016/0316574 A1 Oct. 27, 2016

(30) Foreign Application Priority Data

Apr. 22, 2015 (CN) .......................... 2015 1 0192632

(51) Int. Cl.
*G06F 1/16* (2006.01)

(52) U.S. Cl.
CPC ..................................... *G06F 1/16* (2013.01)

(58) Field of Classification Search
CPC ...... H05K 5/0017; H05K 5/0008; H05K 5/03; H05K 5/0221; G06F 1/1601; G06F 1/1622; G06F 1/1626; G06F 1/16; G06F 1/1637; G06F 1/1652; G06F 1/1613; H04B 1/3833
USPC .......................... 361/679.01, 679.02–679.08, 361/679.21–679.3, 679.55–679.58
See application file for complete search history.

(56) References Cited

U.S. PATENT DOCUMENTS

| | | | | |
|---|---|---|---|---|
| 6,667,780 B2* | 12/2003 | Cho | ..................... | G02B 6/0086 349/58 |
| 9,214,640 B2* | 12/2015 | Lee | ..................... | H01L 51/0097 |
| 2003/0043310 A1* | 3/2003 | Cho | ..................... | G02B 6/0086 349/58 |
| 2003/0043314 A1* | 3/2003 | Lee | ..................... | G02B 6/0065 349/65 |
| 2011/0069027 A1* | 3/2011 | Kim | ..................... | H04M 1/0283 345/173 |
| 2012/0069517 A1* | 3/2012 | Prest | ..................... | G06F 1/1656 361/679.56 |
| 2013/0002583 A1* | 1/2013 | Jin | ..................... | G06F 1/1637 345/173 |
| 2013/0343012 A1* | 12/2013 | Park | ..................... | H05K 7/1417 361/750 |
| 2014/0002385 A1* | 1/2014 | Ka | ..................... | G06F 1/1601 345/173 |
| 2014/0016048 A1* | 1/2014 | Omote | ..................... | G06F 3/044 349/12 |

(Continued)

FOREIGN PATENT DOCUMENTS

CN 103910498 A 7/2014
TW 201421673 A 6/2014

*Primary Examiner* — Courtney Smith
*Assistant Examiner* — Sagar Shrestha
(74) *Attorney, Agent, or Firm* — Steven Reiss

(57) ABSTRACT

A housing includes an upper cover and a lower cover coupled to the upper cover. The upper cover includes a first glass shell with U-shaped cross section, and a first plastic frame attached to the first glass shell. The first glass shell includes a display portion, and a decorative coating layer defined on a surface of the first glass shell toward the first plastic frame. The decorative coating layer surrounds the display portion and extends from the display portion to edge of the first glass shell. The present disclosure also provides an electronic device using the housing.

14 Claims, 7 Drawing Sheets

(56) References Cited

U.S. PATENT DOCUMENTS

| | | | |
|---|---|---|---|
| 2014/0139984 A1* | 5/2014 | Jung | G06F 1/1637 |
| | | | 361/679.01 |
| 2014/0192467 A1* | 7/2014 | Kwong | G06F 1/1601 |
| | | | 361/679.3 |
| 2014/0198436 A1* | 7/2014 | Lim | H04M 1/0266 |
| | | | 361/679.01 |
| 2014/0335322 A1* | 11/2014 | Luo | C03B 23/0307 |
| | | | 428/177 |
| 2015/0031417 A1* | 1/2015 | Lee | H04M 1/72519 |
| | | | 455/566 |
| 2015/0334211 A1* | 11/2015 | Shin | G06F 3/041 |
| | | | 455/566 |

* cited by examiner

HOUSING AND ELECTRONIC DEVICE USING THE SAME

FIELD

The subject matter herein generally relates to housings and electronic devices using the housings.

BACKGROUND

Conventionally, a portable electronic device has a housing that encases electrical components. Often, the portable electronic device has a display arrangement that includes various layers. The various layers usually include at least one display layer, and may additionally include a sensing arrangement (e.g., touch sensors or touch screen) and/or a window disposed and covering the display layer. The window can be a plastic or glass that provides a protective outer surface that protects the display layer. The cover window can form part of an outer surface for the housing of the portable electronic device.

BRIEF DESCRIPTION OF THE DRAWINGS

Implementations of the present technology will now be described, by way of example only, with reference to the attached figures.

DETAILED DESCRIPTION

Figure 1:
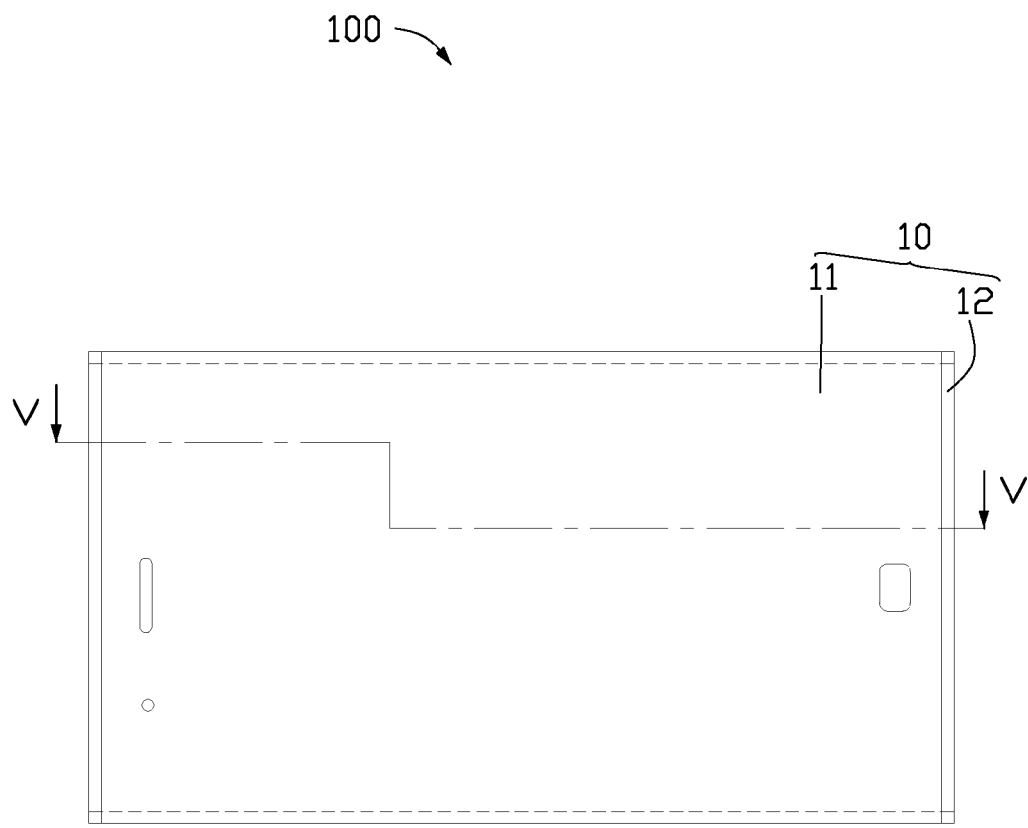
FIG. 1 is a top view of a first embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising", when utilized, means "including, but not necessarily limited to"; it specifically indicates open-ended inclusion or membership in the so-described combination, group, series and the like.

The present disclosure is described in relation to a housing and an electronic device using the housing.

FIG. 1 illustrates a top view of a first embodiment of an electronic device 100. The electronic device 100 can include a housing 10 and a display module 20 (shown in FIG. 2) received in the housing 10, and the housing 10 can include an upper cover 11 and a lower cover 12 coupled to the upper cover 11.

Figure 2:
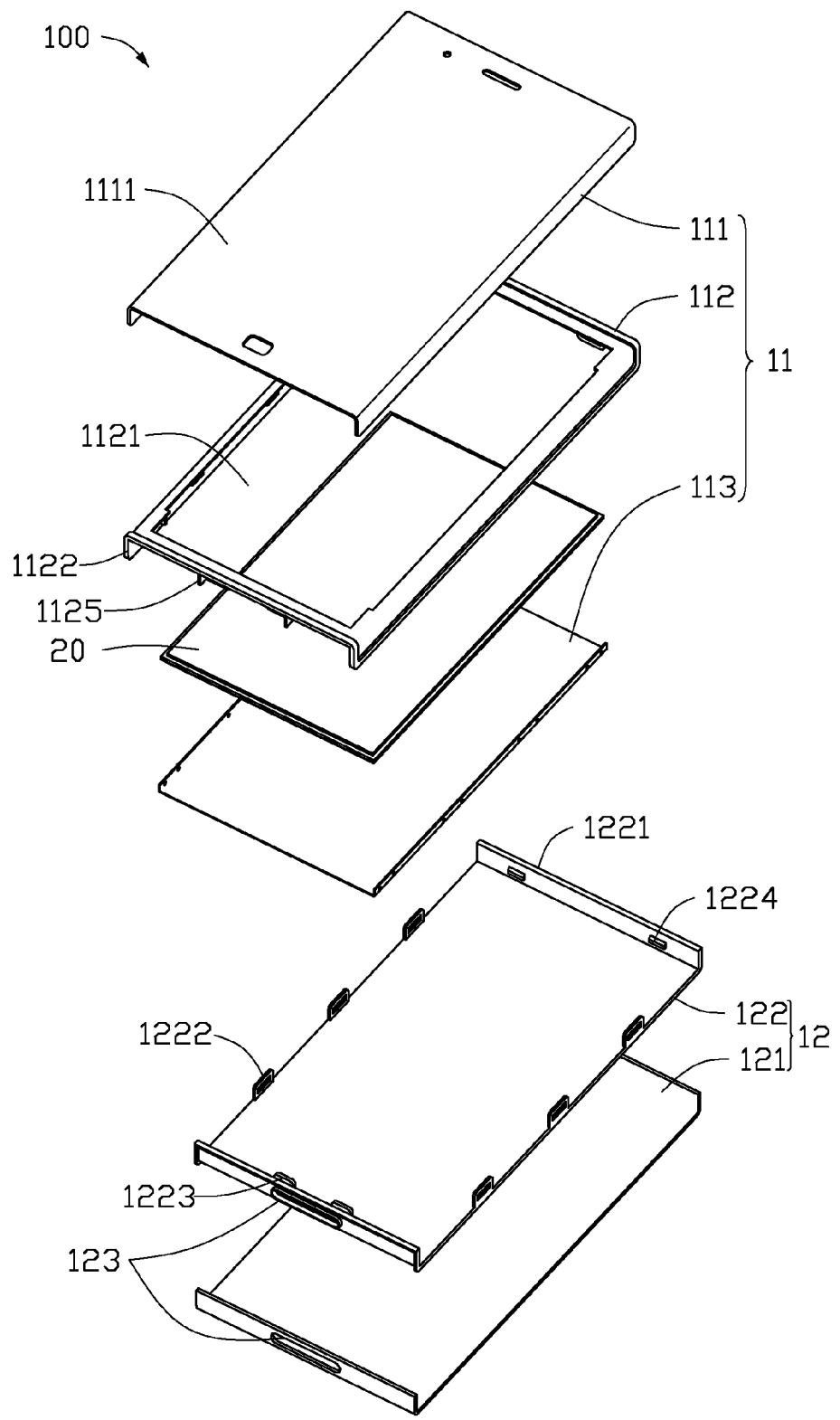
FIG. 2 is an exploded, perspective view of the electronic device of FIG. 1.

FIG. 2 illustrates an exploded, perspective view of the electronic device 100. The upper cover 11 can include a first glass shell 111, a first plastic frame 112 attached to the first glass shell 111, and a fixing plate 113 connected to the first plastic frame 112. A cross-section of the first glass shell 111 can be substantially U-shaped, and the first glass shell 111 can include a transparent display portion 1111 opposite to the display module 20. The display portion 1111 can be substantially located on the center of the first glass shell 111. The fixing plate 113 can be made of metal, which enhances the structural strength of the fixing plate 113, and also improves the heat dissipation effect of the display module 20.

The first glass shell 111 can be connected to the first plastic frame 112 by a adhesive (not shown). The adhesive can be transparent and flexible, and can also be filled between the first glass shell 111 and the display module 20. The display module 20 and the first glass shell 111 can have a gapless connection, which can improve the display of the display portion 1111.

Figure 3:
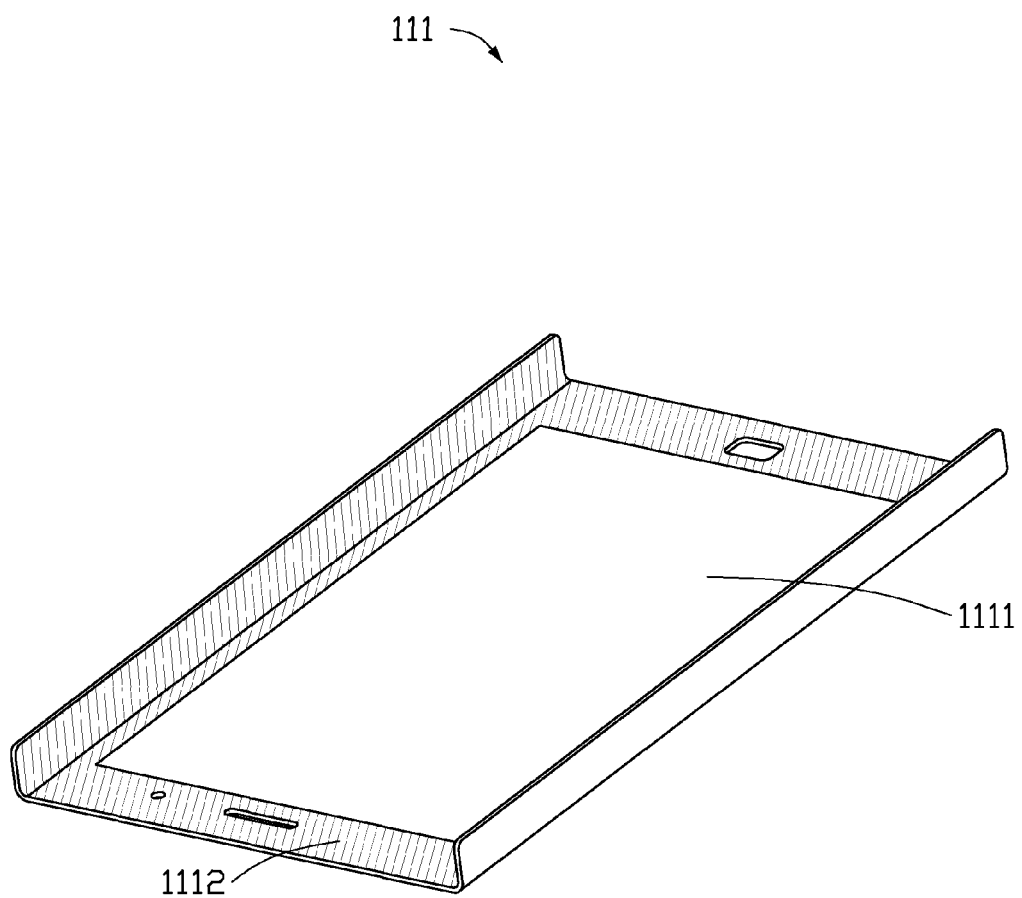
FIG. 3 is an isometric view of a first glass shell of the electronic device of FIG. 2.

FIG. 3 illustrates an isometric view of the first glass shell 111 of the electronic device 100. The first glass shell 111 can include a decorative coating layer 1112 toward the first plastic frame 112 (shown in FIG. 2), and the display portion 1111 can be surrounded by the decorative coating layer 1112. The decorative coating layer 1112 can extend radically from display portion 1111, and can be connected to the edge of the first glass shell 111.

Figure 4:
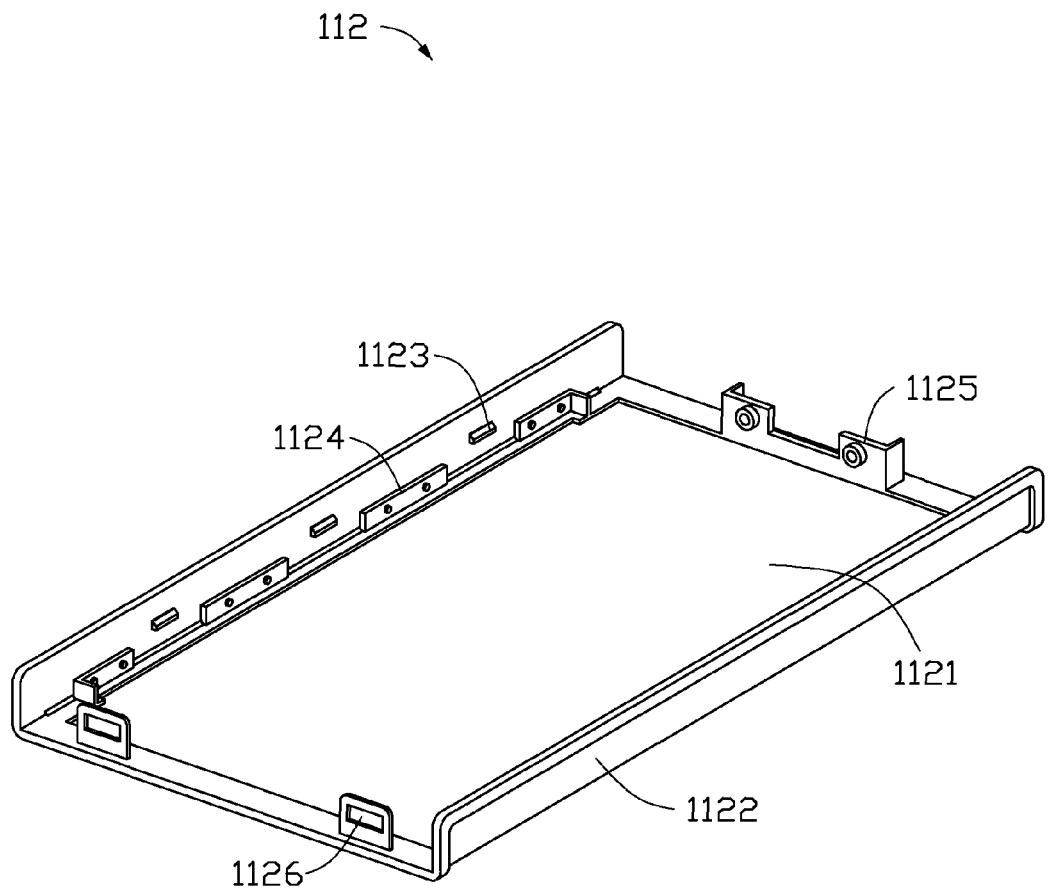
FIG. 4 is an isometric view of a first plastic frame of the electronic device of FIG. 2.

FIG. 4 illustrates an isometric view of the first plastic frame 112 of the electronic device 100. The first plastic frame 112 can include a receiving portion 1121, a pair of first sidewalls 1122, a plurality of first protrusions 1123, and a plurality of fixing portions 1124. The receiving portion 1121 can be configured to receive the display module 20 (shown in FIG. 2), and a size of the receiving portion 1121 can be same as that of the display module 20. The pair of first sidewalls 1122 can be symmetrically defined on two sides of the receiving portion 1121. The plurality of first protrusions 1123 and the plurality of fixing portions 1124 can be alternately positioned with the pair of first sidewalls 1122. The fixing plate 113 can be connected to the first plastic frame 112 by the plurality of fixing portions 1124. The display module 20 can be locked into the receiving portion 1121 by the fixing plate 113.

The first plastic frame 112 can further include a pair of first locking portions 1125 and a pair of first clasps 1126 sandwiched between the two first sidewalls 1122. The first locking portions 1125 can be opposite to the first clasps 1126.

FIG. 2 illustrates the lower cover 12 can include a second glass shell 121, a second plastic frame 122 attached to the second glass shell 121, and an opening 123 passing through the second glass shell 121 and the second plastic frame 122. A shape of the second glass shell 121 can be similar to that of the second plastic frame 122, a cross-section of the second glass shell 121 can be substantially U-shaped. A size of the second glass shell 121 can be larger than that of the second plastic frame 122, and an outer surface of the second plastic frame 122 can be attached to an inner surface of the second glass shell 121. The second glass shell 121 can be connected to the second plastic frame 122 by the transparent adhesive. The inner surface of the second glass shell 121 can be coated with the decorative coating layer 1112 (shown in FIG. 3), which makes the upper cover 11 and lower cover 12 seem like one, inseparable object.

The second plastic frame 122 can include a pair of second sidewalls 1221, a plurality of second clasps 1222 and a pair of second locking portions 1223. The plurality of second clasps 1222 and the second locking portions 1223 can be sandwiched between the pair of second sidewalls 1221. The plurality of second clasps 1222 can extend perpendicularly from the edge of the second plastic frame 122, and can be engaged with the plurality of first protrusions 1123 (shown in FIG. 4) of the upper cover 11. The second locking portions 1223 can be positioned on two sides of the opening 123, and can be engaged with the first locking portions 1125 (shown in FIG. 4) of the upper cover 11.

The second plastic frame 122 can further include two second protrusions 1224 engaged with the first clasps 1126. The two second protrusions 1224 can be positioned with the second sidewalls 1221, away from the second locking portions 1223.

The opening 123 can function as an input/output port or a connector for the power switch. The electronic device 100 can realize battery charging or data transmission by the opening 123.

Figure 5:
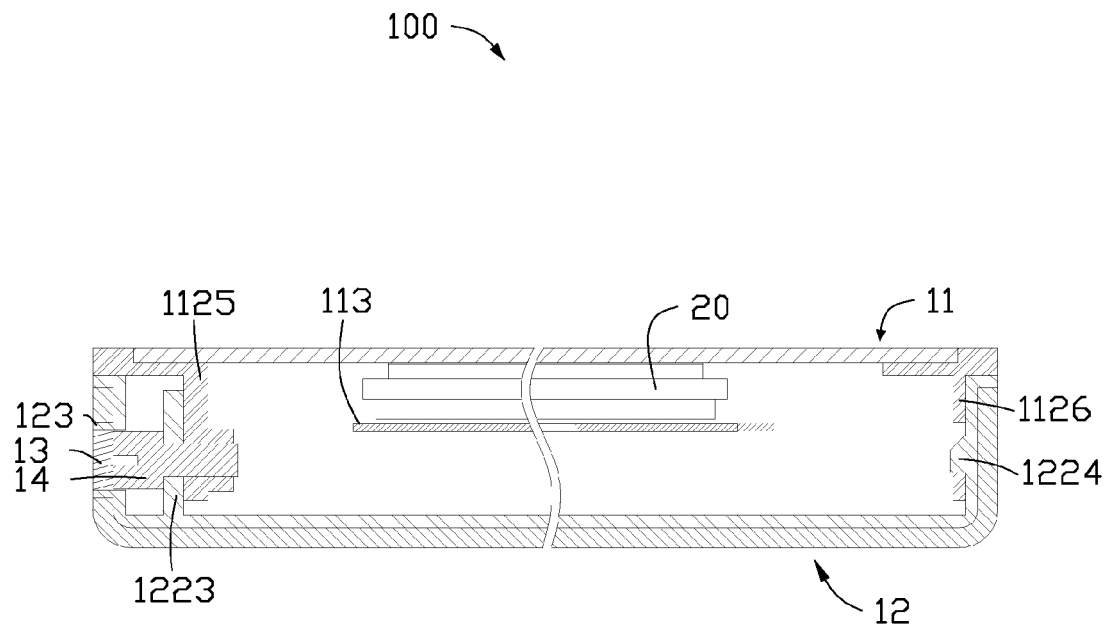
FIG. 5 is a cross-sectional view of the electronic device taken along line V-V of FIG. 1.

FIG. 5 illustrates a cross-sectional view of the electronic device 100. The housing 10 can further include a lid 13 coupled to the opening 123 and a plurality of screws 14. A size of the lid 13 can be same as that of the opening 123, the lid 13 can be filled into the opening 123 without gaps, and the housing 10 can be waterproof. The first locking portion 1125 can be latched to the second locking portions 1223 by the plurality of screws 14, and the upper cover 11 can be steadily connected to the lower cover 12. The plurality of screws 14 can be inserted into the first locking portions 1125 and the second locking portions 1223 via the opening 123.

In assembly, the display module 20 can be received into the receiving portion 1121 of the first plastic frame 112, and the fixing plate 113 can be fastened to the fixing portion 1124 of the first plastic frame 112. The display module 20 can be locked into the receiving portion 1121. Then, the first glass shell 111 can be connected to the first plastic frame 112, and the second glass shell 121 can be connected to the second plastic frame 122. The first protrusions 1123 can be engaged with the second clasps 1222, the first clasps 1126 can be engaged with the second protrusions 1224, the first locking portions 1125 can be engaged with the second locking portions 1123, and the upper cover 11 can be latched to the lower cover 12.

The first glass shell 111 can have a same decorative coating layer 1112 as the second glass shell 121, so the housing 10 seems like one, inseparable unit. The fixing plate 113 not only prevents the display module 20 from being removed from the receiving portion 1121, but also dissipates the heat emitted from the display module 20. The opening 123 can be completely covered by the lid 13, so the electronic device 100 can be waterproof.

Figure 6:
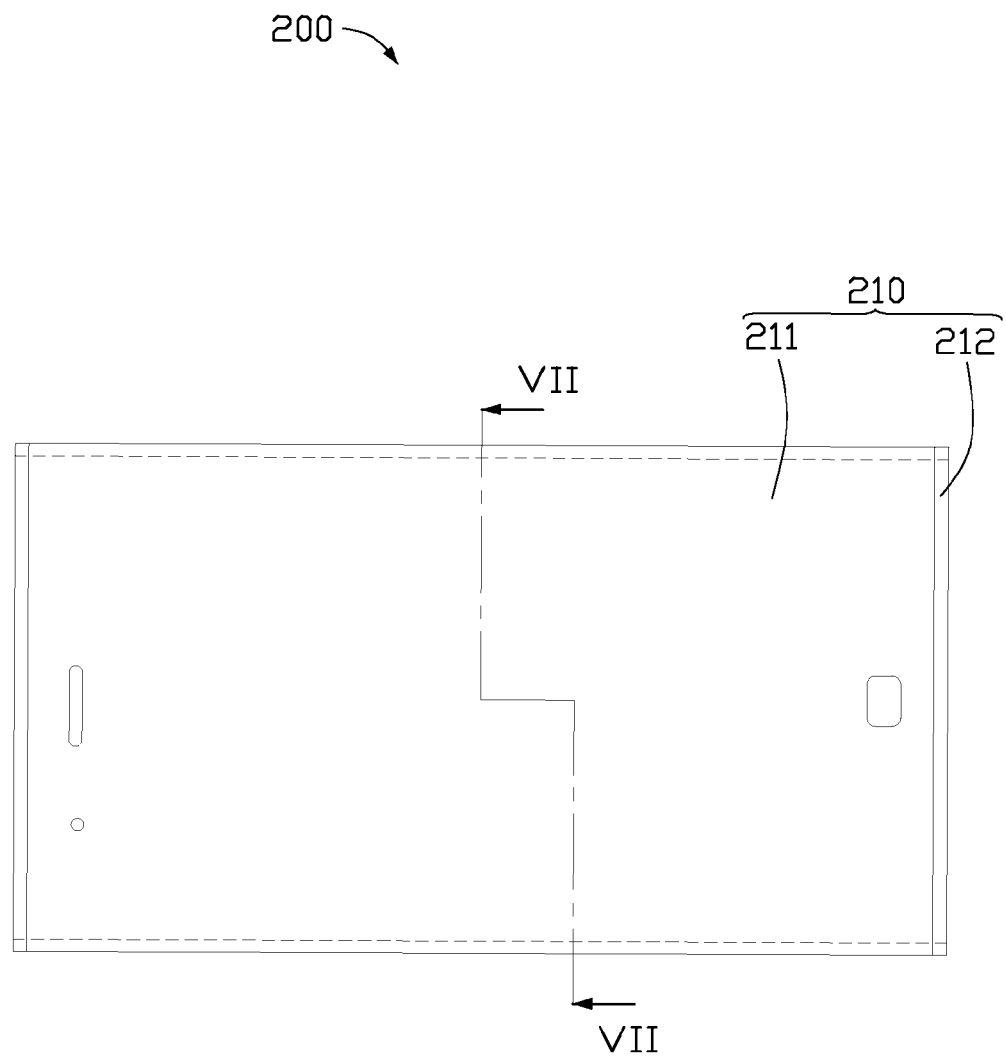
FIG. 6 is a top view of a second embodiment of an electronic device.

FIG. 6 illustrates a top view of a second embodiment of an electronic device 200. The electronic device 200 can include a housing 210, and the housing can include an upper cover 211 and a lower cover 212 coupled to the upper cover 211.

Figure 7:
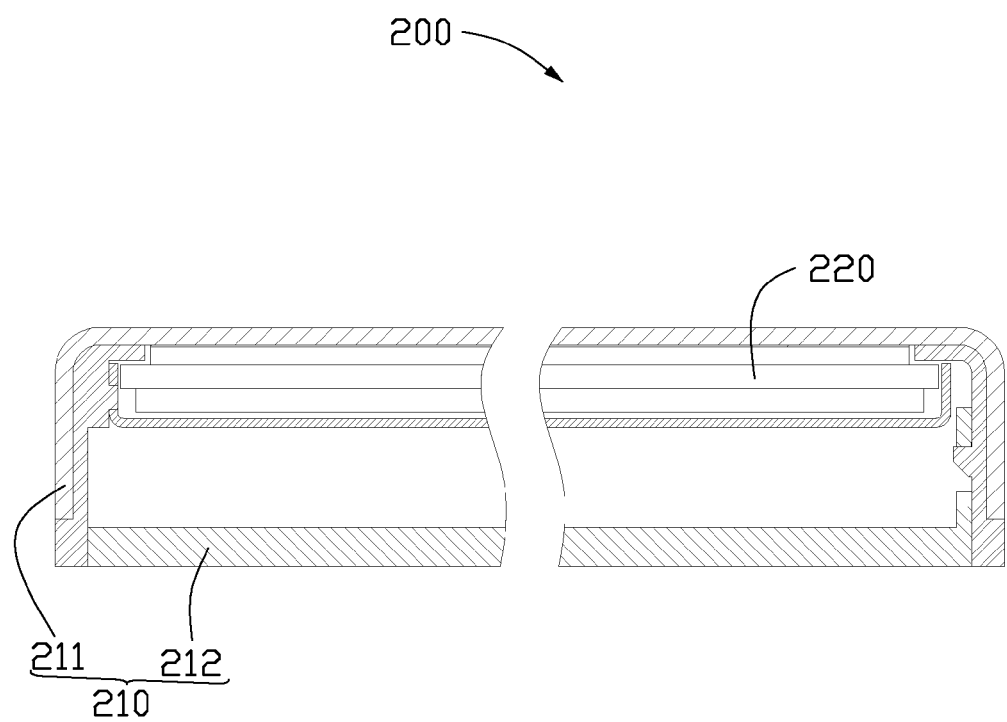
FIG. 7 is a cross-sectional view of the electronic device taken along line VII-VII of FIG. 6.

FIG. 7 illustrates a cross-sectional view of the electronic device 200. The electronic device 200 can also include a display module 220 received in the housing 210. The electronic device 200 can be the same as in the first embodiment, except that the lower cover 212 is integral. The integral lower cover 212 can simplify the assembly process of the electronic device 200. The lower cover 212 can be made of metal, or plastic.

The embodiments shown and described above are only examples. Many details are often found in the art such as the other features of a housing and an electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A housing comprising:
an upper cover comprising:
a first glass shell with U-shaped cross section, and
a first plastic frame attached to the first glass shell, wherein the first glass shell comprises a display portion and a decorative coating layer defined on a surface of the first glass shell toward the first plastic frame;
a lower cover coupled to the upper cover, and comprising:
a second glass shell with a U-shaped cross section,
a second plastic frame attached to the second glass shell, and
an opening passing through the second glass shell and the second plastic frame;
wherein the first plastic frame comprises a pair of first locking portions, the second plastic frame further comprises a pair of second locking portions engaged with the first locking portions, the housing further comprises a plurality of screws inserted into the first locking portions and the second locking portions through the opening; and
wherein the decorative coating layer surrounds the display portion and extends from the display portion to edge of the first glass shell.

2. The housing as claimed in claim 1, wherein the decorative coating layer is coated on an inner surface of the second glass shell.

3. The housing as claimed in claim 2, wherein the first plastic frame further comprises a plurality of first protrusions and a pair of first clasps, the second plastic frame further comprises a plurality of second clasps coupled to the plurality of first protrusions, and a pair of second protrusions coupled to the pair of first clasps.

4. The housing as claimed in claim 3, wherein the upper cover is latched to the lower cover.

5. The housing as claimed in claim 4, wherein the housing further comprises a lid coupled to the opening.

6. The housing as claimed in claim 3, wherein the first plastic frame further comprises a receiving portion, a pair of first sidewalls defined on two sides of the receiving portion, and a plurality of fixing portions.

7. The housing as claimed in claim 6, wherein the plurality of first protrusions and the plurality of fixing portions are alternately positioned along each of the pair of first sidewalls.

8. The housing as claimed in claim 7, wherein the upper cover further comprises a fixing plate, and the fixing plate is connected to the first plastic frame by the plurality of fixing portions.

9. The housing as claimed in claim 1, wherein the lower cover is integral.

10. An electronic device comprising:
a housing comprising:
an upper cover, comprising a first glass shell with U-shaped cross section and a first plastic frame attached to the first glass shell, and
a lower cover coupled to the upper cover, and comprising:
a second glass shell with a U-shaped cross section,
a second plastic frame attached to the second glass shell, and
an opening passing through the second glass shell and the second plastic frame;
wherein the first plastic frame further comprises a pair of first locking portions, the second plastic frame further comprises a pair of second locking portions engaged with the first locking portions, the housing further comprises a plurality of screws inserted into the first locking portions and the second locking portions through the opening; and
a display module received in the housing;
wherein the first glass shell comprises a display portion, and a decorative coating layer defined on a surface of the first glass shell toward the first plastic frame;
wherein the decorative coating layer surrounds the display portion and extends from the display portion to edge of the first glass shell; and
wherein the first plastic frame comprises a receiving portion configured to receive the display module, and the display portion is opposite to the display module.

11. The electronic device as claimed in claim 10, wherein the upper cover comprises a fixing plate connected to the first plastic frame, and the display module is locked into the receiving portion by the fixing plate.

12. The electronic device as claimed in claim 10, wherein the upper cover comprises a plurality of first protrusions and a pair of first clasps, the lower cover comprises a plurality of second clasps coupled to the plurality of first protrusions, and a pair of second protrusions coupled to the pair of first clasps.

13. The electronic device as claimed in claim 12, wherein the upper cover is latched to the lower cover.

14. A housing comprising:
an upper cover comprising:
a first glass shell with U-shaped cross section, and
a first plastic frame attached to the first glass shell, wherein the first glass shell comprises a display portion and a decorative coating layer defined on a surface of the first glass shell toward the first plastic frame;
a lower cover coupled to the upper cover, and comprising:
a second glass shell with a U-shaped cross section, an inner surface of the second glass shell is coated with the decorative coating layer,
a second plastic frame attached to the second glass shell, and
an opening passing through the second glass shell and the second plastic frame;
wherein the first plastic frame further comprises a pair of first locking portions, the second plastic frame further comprises a pair of second locking portions engaged with the first locking portions, the upper cover is latched to the lower cover, the housing further comprises a lid coupled to the opening and a plurality of screws inserted into the first locking portions and the second locking portions through the opening;
wherein the decorative coating layer surrounds the display portion and extends from the display portion to edge of the first glass shell; and
wherein the first plastic frame comprises a plurality of first protrusions and a pair of first clasps, the second plastic frame comprises a plurality of second clasps coupled to the plurality of first protrusions, and a pair of second protrusions coupled to the pair of first clasps.

* * * * *